US 6,690,096 B2

(12) United States Patent
Sasaki

(10) Patent No.: US 6,690,096 B2
(45) Date of Patent: Feb. 10, 2004

(54) SUBMERGENCE-DETECTING POWER-WINDOW APPARATUS

(75) Inventor: Akira Sasaki, Miyagi-ken (JP)

(73) Assignee: Alps Electronic Co., Ltd., Tokyo (JP)

( * ) Notice: Subject to any disclaimer, the term of this patent is extended or adjusted under 35 U.S.C. 154(b) by 217 days.

(21) Appl. No.: 09/804,516

(22) Filed: Mar. 12, 2001

(65) Prior Publication Data
US 2001/0024063 A1 Sep. 27, 2001

(30) Foreign Application Priority Data

Mar. 14, 2000 (JP) ........................................ 2000-070877

(51) Int. Cl.[7] .................................................. B60L 1/00
(52) U.S. Cl. ........................................ 307/10.1; 307/9.1
(58) Field of Search ................................. 307/9.1, 10.1

(56) References Cited

U.S. PATENT DOCUMENTS

| 5,547,208 | A | | 8/1996 | Chappell et al. |
| 5,994,797 | A | | 11/1999 | Yamaoka |
| 6,031,296 | A | * | 2/2000 | Takagi et al. ............... 307/10.1 |
| 6,333,685 | B1 | * | 12/2001 | Miyake .................... 340/425.5 |

FOREIGN PATENT DOCUMENTS

| EP | 0 889 192 A2 | 1/1999 |
| EP | 0 931 899 A1 | 7/1999 |
| JP | Hei 11-71963 | 3/1999 |
| JP | Hei 2000-34861 | 2/2000 |

* cited by examiner

Primary Examiner—Brian Sircus
Assistant Examiner—Robert DeBeradinis
(74) Attorney, Agent, or Firm—Brinks Hofer Gilson & Lione

(57) ABSTRACT

In a submergence-detecting power-window apparatus, with a submergence-detecting circuit put in an inoperative state, a control unit turns on one of multiple control switches corresponding to the operation carried out on the window-opening-and-closing switch, a switch control unit applies a control voltage to a motor-driving unit through the turned-on control switch to drive the window-opening-and-closing motor in order to open or close the window; and with the submergence-detecting circuit put in an operative state by the car's submergence, a turned-on state of any one of the control switches is made ineffective and an operation carried out on the submergence-time window-opening switch causes a control voltage to be supplied to the motor-driving unit in order to open the window.

5 Claims, 3 Drawing Sheets

SUBMERGENCE-DETECTING POWER-WINDOW APPARATUS

BACKGROUND OF THE INVENTION

1. Field of the Invention

In general, the present invention relates to a submergence-detecting power-window apparatus. More particularly, the present invention relates to a submergence-detecting power-window apparatus in which a window-opening switch and a submergence-time window-opening switch are provided on a car, and when the car submerges, the submergence-time window-opening switch is actuated to open a window.

2. Description of the Prior Art

Generally, a power-window apparatus of a car comprises a window-opening-and-closing motor, a relay-driving unit for selectively driving the window-opening-and-closing motor into a rotation in a direction to open or close the window, a window-opening control switch and a window-closing control switch. In addition, the power-window apparatus also includes a switch control unit, a window-opening switch, a window-closing switch and a control unit. The switch control unit applies a control voltage to the relay-driving unit through the window-opening control switch or the window-closing control switch. The control unit turns the window-opening control switch on when the window-opening switch is operated. Similarly, the control unit turns the window-closing control switch on when the window-closing switch is operated.

FIG. 3 is a circuit diagram showing a typical configuration of main components composing the conventional power-window apparatus. To be more specific, the figure shows the configuration of a window-operating unit 30 on the driver-seat side.

As shown in FIG. 3, the window-operating unit 30 of the power-window apparatus on the driver-seat side comprises a window-opening-and-closing motor 31, a window-closing-direction relay 32U, a window-opening-direction relay 32D, a switch control unit 33, a control unit (CPU) 34, a window-closing switch 35U, a window-opening switch 35D, a front-passenger-seat-window-opening-and-closing switch 36A, a right-rear-seat-window-opening-and-closing switch 36R, a left-rear-seat-window-opening-and-closing switch 36L, a window-opening-and-closing auto switch 37, a pinch-detecting circuit 38, an interface circuit (I/F) 39, a power-supply terminal 40 and an external connection terminal 41.

The window-closing-direction relay 32U and the window-opening-direction relay 32D each comprise a relay winding and contacts. The switch control unit 33 comprises a first window-closing control transistor $33U_1$, a second window-closing control transistor $33U_2$, a first window-opening control transistor $33D_1$, a second window-opening control transistor $33D_2$ and a plurality of resistors each not denoted by a reference numeral. The window-closing switch 35U and the window-opening switch 35D are each a single-pole double-contact switch. Likewise, the front-passenger-seat-window-opening-and-closing switch 36A, the right-rear-seat-window-opening-and-closing switch 36R and the left-rear-seat-window-opening-and-closing switch 36L are each a single-pole double-contact switch. On the other hand, the window-opening-and-closing auto switch 37 is a single-pole single-contact circuit.

One terminal of the window-opening-and-closing motor 31 is connected to the movable contact of the window-closing-direction relay 32U while the other terminal of the window-opening-and-closing motor 31 is connected to the movable contact of the window-opening-direction relay 32D. One end of the relay winding employed in the window-closing-direction relay 32U is connected to the collector of the first window-closing control transistor 33U, employed in the switch control unit 33 while the other end of the relay winding is connected to the ground. One of the fixed contacts employed in the window-closing-direction relay 32U is connected to the power-supply terminal 40 while the other fixed contact is connected to the ground. In the same way, one end of the relay winding employed in the window-opening-direction relay 32D is connected to the collector of the first window-opening control transistor $33D_1$ employed in the switch control unit 33 while the other end of the relay is connected to the ground. One of the fixed contacts employed in the window-opening-direction relay 32D is also connected to the power-supply terminal 40 while the other fixed contact is connected to the ground as well.

In the switch control unit 33, the base of the first window-closing control transistor $33U_1$ is connected to the collector of the second window-closing control transistor $33U_2$ by a resistor whereas the emitter thereof is connected to the power-supply terminal 40. The base of the second window-closing control transistor $33U_2$ is connected to the control unit 34 by a resistor and the emitter thereof is connected to the ground. Similarly, the base of the first window-opening control transistor $33D_1$ is connected to the collector of the second window-opening control transistor $33D_2$ by a resistor whereas the emitter thereof is connected to the power-supply terminal 40. The base of the second window-opening control transistor $33D_2$ is connected to the control unit 34 by a resistor and the emitter thereof is connected to the ground. The movable contact of the window-closing switch 35U is connected to the control unit 34. One of the fixed contacts of the window-closing switch 35U is connected to the power-supply terminal 40 while the other contact is open. In the same way, the movable contact of the window-opening switch 35D is connected to the control unit 34. One of the fixed contacts of the window-opening switch 35D is connected to the power-supply terminal 40 while the other contact is open.

The movable contact of the front-passenger-seat-window-opening-and-closing switch 36A is connected to the ground while the fixed contacts thereof are both connected to the control unit 34. The left-rear-seat-window-opening-and-closing switch 36L and the right-rear-seat-window-opening-and-closing switch 36R are each wired in the same way of the front-passenger-seat-window-opening-and-closing switch 36A. The movable contact of the window-opening-and-closing auto switch 37 is connected to the ground while the fixed contact thereof is connected to the control unit 34. The pinch-detecting circuit 38 is connected to the control unit 34. One end of the interface circuit 39 is connected to the control unit 34 while the other end is connected to the external connection terminal 41.

In addition, besides the driver-seat-side-window-operating unit 30, the conventional power-window apparatus also includes a front-passenger-seat-window-operating unit, a right-rear-seat-window-operating unit and a left-rear-seat-window-operating unit, which are not shown in FIG. 3. The configurations of the front-passenger-seat-window-operating unit, the right-rear-seat-window-operating unit and the left-rear-seat-window-operating unit are each the same as that of the driver-seat-side-window-operating unit 30 except for the following differences. In the first place, in the front-passenger-seat-window-operating unit, the right-rear-seat-window-operating unit and the left-rear-seatwindow-operating unit, the window-closing switch 35U and the window-opening switch 35D are switches for respectively closing and opening a window of a seat for which the window-operating unit is provided. In the second place, the front-passenger-seat-window-operating unit, the right-rear-seat-window-operating unit and the left-rear-seat-window-operating unit are each provided with neither the front-passenger-seat-window-opening-and-closing switch 36A, the left-rear-seat-window-opening-and-closing switch 36L, the right-rear-seat-window-opening-and-closing switch 36R and the window-opening-and-closing auto switch 37. The driver-seat-side-window-operating unit 30, the front-passenger-seat-window-operating unit, the right-rear-seat-window-operating unit and the left-rear-seat-window-operating unit are connected to each other by connection lines connecting their external connection terminals 41 to each other.

The driver-seat-side-window-operating unit 30 having the configuration described above operates as follows.

With the window-closing switch 35U not operated, the movable contact of the window-closing switch 35U is connected to the open fixed contact as shown in FIG. 3. In this case, the control unit 34 does not supply a control signal to the second window-closing control transistor $33U_2$, putting the first window-closing control transistor $33U_1$ in an off state. Thus, the window-closing-direction relay 32U is not energized, connecting the movable contact thereof to the fixed contact connected to the ground as shown in FIG. 3. Similarly, with the window-opening switch 35D not operated, the movable contact of the window-opening switch 35D is connected to the open fixed contact as shown in FIG. 3. In this case, the control unit 34 does not supply a control signal to the second window-opening control transistor $33D_2$, putting the first window-opening control transistor $33D_1$ in an off state. Thus, the window-opening-direction relay 32D is not energized, connecting the movable contact thereof to the fixed contact connected to the ground as shown in FIG. 3. As a result, the ground electric potential is applied to both terminals of the window-opening-and-closing motor 31, preventing the motor 31 from rotating. Thus, the window is not slid in either direction.

Assume that the window-closing switch 35U is operated to connect the movable contact of the window-closing switch 35U to the fixed contact connected to the power-supply terminal 40. In this case, a power-supply voltage is applied to the control unit 34 through the movable contact, causing the control unit 34 to supply a control signal to the second window-closing control transistor $33U_2$. Therefore, the first window-closing control transistor $33U_1$ is in an on state at the same time. With the first window-closing control transistor $33U_1$ turned on, the window-closing-direction relay 32U is energized by the power-supply voltage supplied through the first window-closing control transistor $33U_1$, switching the movable contact of the window-closing-direction relay 32U to the fixed contact connected to the power-supply terminal 40. In this state, in the window-opening-and-closing motor 31, the power supply voltage is applied to one end and the ground voltage is applied to the other end. As a result, the window-opening-and-closing motor 31 rotates in a direction, sliding the window in the closing direction.

On the other hand, assume that, while the window-closing switch 35U is not operated, the window-opening switch 35D is operated to connect the movable contact to the fixed contact. In this case, a power-supply voltage is applied to the control unit 34 through the window-opening switch 35D, causing the control unit 34 to supply a control signal to the second window-opening control transistor $33D_2$. The control signal puts the second window-opening control transistor $33D_2$ and, hence, the first window-opening control transistor $33D_1$ in an on state at the same time. With the first window-opening control transistor $33D_1$ turned on, the window-opening-direction relay 32D is energized by the power-supply voltage supplied through the first window-opening control transistor $33D_1$, switching the movable contact of the window-opening-direction relay 32D to the fixed contact connected to the power-supply terminal 40. In this state, in the window-opening-and-closing motor 31, the ground voltage is applied to one end and the power supply voltage is applied to the other end. As a result, the window-opening-and-closing motor 31 rotates in a direction, sliding the window in the opening direction.

Next, assume that, right after an operation of the window-closing switch 35U, the window-opening-and-closing auto switch 37 is operated. In this case, the window-opening-and-closing motor 31 rotates in a direction, sliding the window in the closing direction for the same reason described above. At that time, however, the control unit 34 executes control to continue the sliding of the window in the closing direction even if the operation of the window-closing switch 35U and/or the operation of the window-opening-and-closing auto switch 37 are terminated. In addition, the sliding of the window in the closing direction is continued till the window is closed completely.

If the window-opening-and-closing auto switch 37 is operated right after an operation of the window-opening switch 35D, likewise, the control unit 34 executes control to continue the sliding of the window in the opening direction till the window is opened completely even if the operation of the window-opening switch 35D and/or the operation of the window-opening-and-closing auto switch 37 are terminated.

When the front-passenger-seat-window-opening-and-closing switch 36A is operated to set the movable contact at a position to open the window on the front-passenger-seat side, the control unit 34 detects the operation and outputs a signal to open the window to the front-passenger-seat-window-operating unit not shown in the figure. The signal to open the window is supplied to the external connection terminal 41 by way of the interface circuit 39. From the external connection terminal 41, the signal to open the window propagates to the front-passenger-seat-window-operating unit through the connection line, sliding the window in the opening direction. When the front-passenger-seat-window-opening-and-closing switch 36A is operated to set the movable contact at a position to close the window of the front-passenger-seat side, on the other hand, the window is slid in the closing direction.

In exactly the same way, when the right-rear-seat-window-opening-and-closing switch 36R is operated to set the movable contact at a position to open or close the window on the right-rear-seat side, the window is slid in the opening or closing direction respectively. Similarly, when the left-rear-seat-window-opening-and-closing switch 36L is operated to set the movable contact at a position to open or close the window on the left-rear-seat side, the window is slid in the opening or closing direction respectively.

In addition, when the pinch-detecting circuit 38 detects a pinch of a thing by a window while the window is being slid in the closing direction, the pinch-detecting circuit 38 outputs a pinch detection signal to the control unit 34. At that time, the control unit 34 controls the switch control unit 33, the window-closing-direction relay 32U and the windowopening-direction relay 32D to halt the window-opening-and-closing motor 31 or to rotate the window-opening-and-closing motor 31 in the reversed direction.

It should be noted that, already generally known, the actual configuration and the operation of the pinch-detecting circuit 38 employed in the power-window apparatus are not described.

Since the driver-seat-side-window-operating unit 30 employed in the conventional power-window apparatus is installed inside a car or, in particular, inside the door on the driver-seat side, the size of the driver-seat-side-window-operating unit 30 must be made small. For this reason, the window-closing switch 35U and the window-opening switch 35D must each also have as a small size as possible. If the car falls into water, submerging the body thereof for some reason, however, water flows into the window-closing switch 35U and the window-opening switch 35D, damaging insulators between contacts. As a result, the contacts are put in a conductive state without regard to the position of the movable contact. In this condition, the window-opening-and-closing motor 31 does not rotate normally even if the window-opening switch 35D is operated so that the window cannot be opened. In consequence, the driver and passengers are not capable of escaping from the submerged car.

SUMMARY OF THE INVENTION

It is thus an object of the present invention to provide a submergence-detecting power-window apparatus that is reliably capable of opening a window when the user operates a submergence-time window-opening switch separately provided along with a submergence-detecting circuit.

In order to achieve the object described above, the present invention provides a submergence-detecting power-window apparatus comprising: a window-opening-and-closing motor for opening or closing a window; a motor-driving unit for selectively driving the window-opening-and-closing motor; a switch control unit provided with control switches and used for supplying a control voltage to the motor-driving unit; a window-opening-and-closing switch; a control unit for turning on one of the control switches corresponding to an operation carried out on the window-opening-and-closing switch; a submergence-detecting circuit including a submergence-detecting sensor; and a submergence-time window-opening switch, wherein: when an operation is carried out on the window-opening-and-closing switch with the submergence-detecting circuit put in an inoperative state, the control unit turns on one of the control switches corresponding to the operation carried out on the window-opening-and-closing switch, the switch control unit applies a control voltage to the motor-driving unit through the turned-on control switch to drive the window-opening-and-closing motor in order to open or close the window; and with the submergence-detecting circuit put in an operative state by the car's submergence detected by the submergence-detecting sensor, a turned-on state of any one of the control switches is made ineffective and an operation carried out on the submergence-time window-opening switch causes a control voltage to be supplied to the motor-driving unit to drive the window-opening-and-closing motor in order to open the window.

In the configuration described above, by providing the submergence-detecting circuit and the submergence-time window-opening switch on the unit for operating the window on the driver-seat side, in the event of submergence of the car, the submergence-detecting circuit detects the submergence, outputting a submergence detection signal for stopping an operation to drive the window-opening-and-closing motor and allowing the submergence-time window-opening switch to be operated to drive the window-opening-and-closing motor in order to slide the window in the opening direction. Thus, by operating the submergence-time window-opening switch, the window can be reliably opened even if portions of the unit for operating the window on the driver-seat side are affected by the submergence.

In the configuration described above, by directly connecting the submergence-time window-opening switch to the window-opening-and-closing motor-driving unit, it is possible to provide a structure in which, when the submergence-time window-opening switch is operated, a control voltage can be supplied to the window-opening-and-closing motor-driving unit by way of the submergence-time window-opening switch.

In the structure described above, by operating the submergence-time window-opening switch with all the control switches turned off, a control voltage is supplied to the window-opening-and-closing motor-driving unit to drive the window-opening-and-closing motor into a rotation allowing the window to be slid in the opening direction. In this way, a configuration portion comprising the submergence-detecting circuit and the submergence-time window-opening switch can be separated from the rest of the configuration, making it possible to enhance the degree of freedom in designing the circuits.

In addition, in the configuration described above, by connecting the submergence-time window-opening switch to one of the control switches that serves as a window-opening control switch, it is possible to provide another structure wherein, when the submergence-time window-opening switch is operated, a control voltage is supplied to the window-opening-and-closing motor-driving unit by way of the submergence-time window-opening switch and the window-opening control switch.

In the other structure described above, by operating the submergence-time window-opening switch, the window-opening control switch once turned off is turned on again to supply a control voltage to the window-opening-and-closing motor-driving unit to drive the window-opening-and-closing motor into a rotation allowing the window to be slid in the opening direction. Thus, by utilizing the window-opening control switch in this way, a configuration portion comprising the submergence-detecting circuit and the submergence-time window-opening switch can be made simpler by virtue of the use of the window-opening control switch.

DETAILED DESCRIPTION OF THE PREFERRED EMBODIMENTS

Some preferred embodiments of the present invention are described by referring to diagrams as follows.

Figure 1:
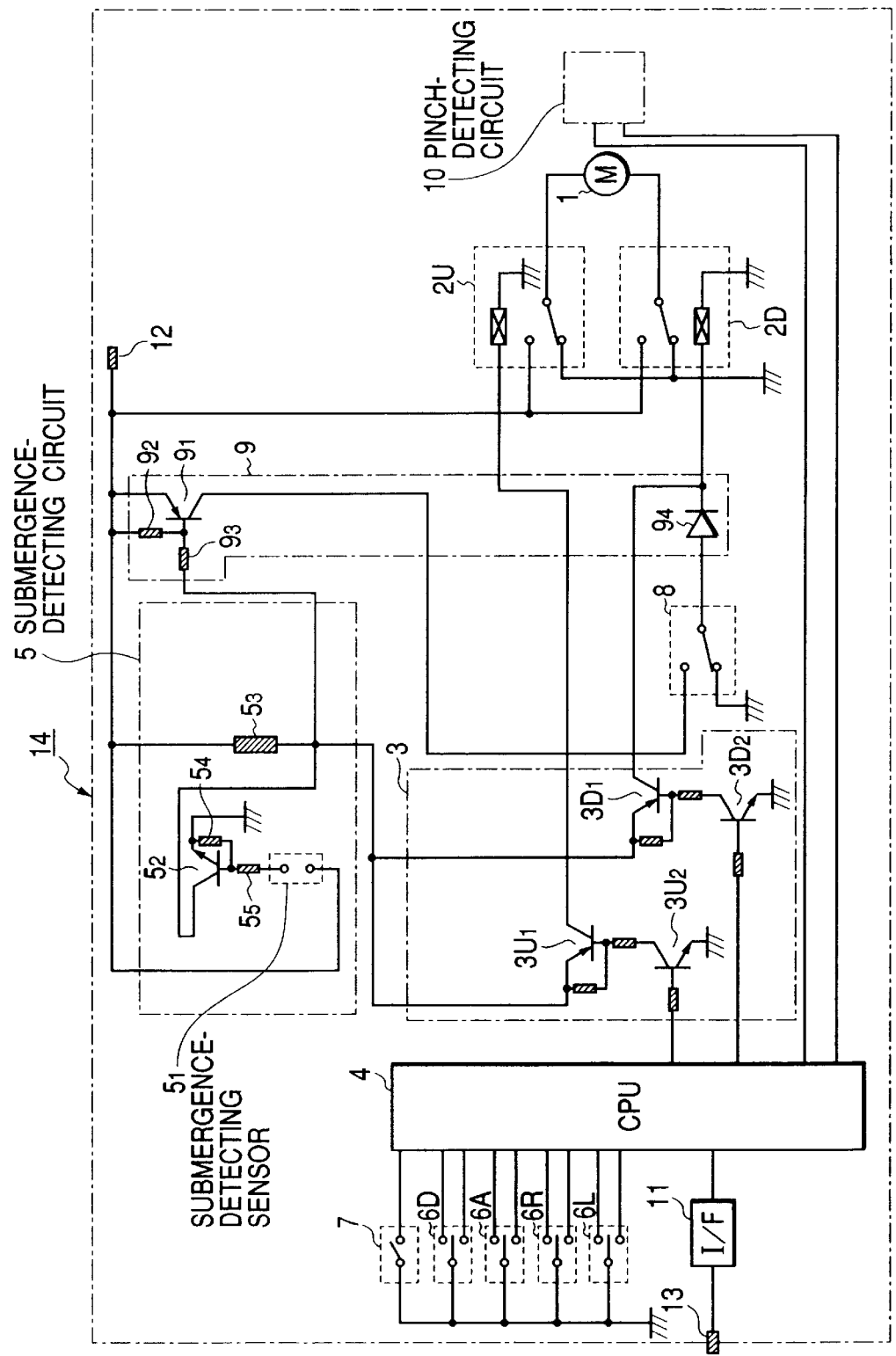
FIG. 1 is a circuit diagram showing the configuration of main components composing a submergence-detecting power-window apparatus implemented by a first embodiment of the present invention.

FIG. 1 is a circuit diagram showing a first embodiment implementing a submergence-detecting power-window apparatus provided by the present invention. To be more specific, the figure shows the configuration of a driver-seat-side-window-operating unit employed in the submergence-detecting power-window apparatus.

As shown in FIG. 1, the driver-seat-side-window-operating unit 14 implemented by the first embodiment comprises a window-opening-and-closing motor 1, a window-closing-direction relay 2U (motor-driving unit), a window-opening-direction relay 2D (motor-driving unit), a switch control unit 3, a control unit (CPU) 4, a submergence-detecting circuit 5, a driver-seat-window-opening-and-closing switch 6D, a front-passenger-seat-window-opening-and-closing switch 6A, a right-rear-seat-window-opening-and-closing switch 6R, a left-rear-seat-window-opening-and-closing switch 6L, a window-opening-and-closing auto switch 7, a submergence-time window-opening switch 8, a submergence-time-window-opening-switch-driving circuit 9, a pinch-detecting circuit 10, an interface circuit (I/F) 11, a power-supply terminal 12 and an external connection terminal 13.

The window-closing-direction relay 2U and the window-opening-direction relay 2D each comprise a relay winding and contacts. The switch control unit 3 comprises a first window-closing control transistor $3U_1$, a second window-closing control transistor $3U_2$, a first window-opening control transistor $3D_1$, a second window-opening control transistor $3D_2$ and a plurality of resistors each not denoted by a reference numeral. The submergence-detecting circuit 5 comprises a submergence-detecting sensor $5_1$, a switching transistor $5_2$, a collector resistor $5_3$, a base bias resistor $5_4$ and a base series resistor $5_5$. The submergence-time-window-opening-switch-driving circuit 9 comprises a switching transistor $9_1$, a base bias resistor $9_2$, a base series resistor $9_3$ and a buffer diode $9_4$. The driver-seat-window-opening-and-closing switch 6D, the front-passenger-seat-window-opening-and-closing switch 6A, the right-rear-seat-window-opening-and-closing switch 6R, the left-rear-seat-window-opening-and-closing switch 6L and the submergence-time window-opening switch 8 are each a single-pole double contact switch. On the other hand, the window-opening-and-closing auto switch 7 is a single-pole single-contact circuit. The submergence-detecting sensor $5_1$ comprises a pair of conductors provided at close locations facing each other.

One terminal of the window-opening-and-closing motor 1 is connected to the movable contact of the window-closing-direction relay 2U while the other terminal thereof is connected to the movable contact of the window-opening-direction relay 2D. One end of the relay winding employed in the window-closing-direction relay 2U is connected to the collector of the first window-closing control transistor $3U_1$ employed in the switch control unit 3 while the other end of the relay winding is connected to the ground. One of the fixed contacts employed in the window-closing-direction relay 2U is connected to the terminal 12 while the other fixed contact is connected to the ground. In the same way, one end of the relay winding employed in the window-opening-direction relay 2D is connected to the collector of the first window-opening control transistor $3D_1$ employed in the switch control unit 3 while the other end of the relay is connected to the ground. One of the fixed contacts is also connected to the terminal 12 while the other fixed contact is connected to the ground as well.

In the switch control unit 3, the base of the first window-closing control transistor $3U_1$ is connected to the collector of the second window-closing control transistor $3U_2$ by a resistor whereas the emitter of the first window-closing control transistor $3U_1$ is connected to the collector of the switching transistor $5_2$. The base of the second window-closing control transistor $3U_2$ is connected to the control unit 4 by a resistor and the emitter thereof is connected to the ground. Similarly, the base of the first window-opening control transistor $3D_1$ is connected to the collector of the second window-opening control transistor $3D_2$ by a resistor whereas the emitter thereof is connected to the collector of the switching transistor $5_2$. The base of the second window-opening control transistor $3D_2$ is connected to the control unit 4 by a resistor and the emitter thereof is connected to the ground.

In the submergence-detecting circuit 5 one of the ends of the submergence-detecting sensor $5_1$ is connected to the power-supply terminal 12 and the other end is connected to the base of the switching transistor $5_2$ by the base-series resistor $5_5$. The base of the switching transistor $5_2$ is connected to the ground by the base-bias resistor $5_4$ and the collector of the switching transistor $5_2$ is connected to the power-supply terminal 12 by the collector resistor $5_3$. The emitter of the switching transistor $5_2$ is connected to the ground. In the submergence-time-window-opening-switch-driving circuit 9, the base of the switching transistor $9_1$ is connected to the collector of the switching transistor $5_2$ by the base-series resistor $9_3$ and connected to the power-supply terminal 12 by the base-bias resistor $9_2$. The collector of the switching transistor $9_1$ is connected to one of fixed contacts of the submergence-time window-opening switch 8 whereas the emitter of the switching transistor 9 is connected to the power-supply terminal 12. The anode of the buffer diode $9_4$ is connected to the movable contact of the submergence-time window-opening switch 8 and the cathode of the buffer diode $9_4$ is connected to one of the ends of a relay winding employed in the window-opening-direction relay 2D.

The movable contacts of the driver-seat-window-opening-and-closing switch 6D, the front-passenger-seat-window-opening-and-closing switch 6A, the left-rear-seat-window-opening-and-closing switch 6L and the right-rear-seat-window-opening-and-closing switch 6R are connected to the ground while the fixed contacts thereof are both connected to the control unit 4. The movable contact of the window-opening-and-closing auto switch 7 is connected to the ground while the fixed contact thereof is connected to the control unit 4. The other fixed contact of the submergence-time window-opening switch 8 is connected to the ground. The pinch-detecting circuit 10 is connected to the control unit 4. One end of the interface circuit 11 is connected to the control unit 4 while the other end is connected to the external connection terminal 13.

In addition, besides the driver-seat-side-window-operating unit 14, the conventional power-window apparatus also includes a front-passenger-seat-window-operating unit, a right-rear-seat-window-operating unit and a left-rear-seat-window-operating unit, which are not shown in FIG. 1, as is the case with the conventional power-window apparatus. The configurations of the front-passenger-seat-window-operating unit, the right-rear-seat-window-operating unit and the left-rear-seat-window-operating unit are each the same as that of the driver-seat-side-window-operating unit 14 except for the following differences. In the first place, in the front-passenger-seat-window-operating unit, the right-rear-seat-window-operating unit and the left-rear-seat-window-operating unit, the driver-seat-window-opening-and-closing switch 6D is a switch for closing and opening a window of a seat for which the window-operating unit is provided. In the second place, the front-passenger-seat-window-operating unit, the right-rear-seat-window-operating unit and the left-rear-seat-window-operating unit are each provided with neither the front-passenger-seat-window-opening-and-closing switch 6A, the left-rear-seat-window-opening-and-closing switch 6L, the right-rear-seat-window-opening-and-closing switch 6R and the window-opening-and-closing auto switch 7. The driver-seat-side-window-operating unit 14, the front-passenger-seat-window-operating unit, the right-rear-seat-window-operating unit and the left-rear-seat-window-operating unit are connected to each other by connection lines connecting their external connection terminals 13 to each other.

Instead of adopting the configuration described above, any ones of the front-passenger-seat-window-operating unit, the right-rear-seat-window-operating unit and the left-rear-seat-window-operating unit may adopt the configuration of the conventional power-window apparatus excluding the submergence-detecting circuit 5, the submergence-time window-opening switch 8 and the submergence-time-window-opening-switch-driving circuit 9.

The driver-seat-side-window-operating unit 14 having the configuration described above operates as follows.

First of all, the operation in the normal state of the car is explained.

With the driver-seat-window-opening-and-closing switch 6D not operated, the movable contact of the driver-seat-window-opening-and-closing switch 6D is connected to neither of the fixed contacts thereof as shown in FIG. 1. In this case, the control unit 4 does not supply a control signal to the second window-closing control transistor $3U_2$, putting the first window-closing control transistor $3U_1$ in an off state. Thus, the window-closing-direction relay 2U is not energized. In this state, the movable contact of the window-closing-direction relay 2U is connected to the fixed contact connected to the ground as shown in FIG. 1. Similarly, the control unit 4 does not supply a control signal to the second window-opening control transistor $3D_2$, putting the first window-opening control transistor $3D_1$ in an off state. Thus, the window-opening-direction relay 2D is not energized. In this state, the movable contact of the window-opening-direction relay 2D is connected to the fixed contact connected to the ground as shown in FIG. 1. Since the ground potential is applied to both the terminals of the window-opening-and-closing motor 1, the window does not slide in either direction.

At that time, the submergence-detecting sensor $5_1$ employed in the submergence-detecting circuit 5 does not detect any submergence. With no submergence detected, the impedance of the submergence-detecting sensor $5_1$ has a very large value, turning off the switching transistor $5_2$. With the switching transistor $5_2$ turned off, a power-supply voltage appearing at the power-supply terminal 12 is supplied to the emitters of the first window-closing control transistor $3U_1$ and the first window-opening control transistor $3D_1$ through the collector resistor $5_3$. In the submergence-time-window-opening-switch-driving circuit 9, the base voltage of the switching transistor $9_1$ is raised to a level close to the power-supply voltage, turning off the switching transistor $9_1$. With the switching transistor $9_1$ turned off, the power-supply voltage is not supplied to the submergence-time window-opening switch 8 so that the power-supply voltage is also not supplied to the window-opening-direction relay 2D by way of the submergence-time window-opening switch 8 as a driving voltage even if the submergence-time window-opening switch 8 is operated inadvertently.

Assume that the driver-seat-window-opening-and-closing switch 6D is operated to close the window by connecting the movable contact to a particular fixed contact. In this case, the ground voltage is applied to the control unit 4 through the movable contact. In response to this ground voltage, the control unit 4 outputs a control signal to the second window-closing control transistor $3U_2$. The control signal puts the second window-closing control transistor $3U_2$ and, hence, the first window-closing control transistor $3U_1$ in an on state at the same time. With the first window-closing control transistor $3U_1$ turned on, the window-closing-direction relay 2U is energized by the power-supply voltage through the collector resistor $5_3$ and the first window-closing control transistor $3U_1$, switching the movable contact of the window-closing-direction relay 2U to the fixed contact connected to the power-supply terminal 12. In this state, in the motor 1, the power supply voltage is applied to one end, and the ground voltage is applied to the other end. As a result, the window-opening-and-closing motor 1 rotates in a direction, sliding the window in the closing direction.

On the other hand, when that the driver-seat-window-opening-and-closing switch 6D is operated to open the window, the movable contact is switched to the other fixed contact. In this case, the ground voltage is supplied to the control unit 4 through the movable contact. In response to the supply of this ground voltage, the control unit 4 outputs a control signal to the second window-opening control transistor $3D_2$. The control signal puts the second window-opening control transistor $3D_2$ in an on state and, hence, the first window-opening control transistor $3D_1$ in an on state at the same time. With the first window-opening control transistor $3D_1$ turned on, the window-opening-direction relay 2D is energized by the power-supply voltage through the collector resistor $5_3$ and the first window-opening control transistor $3D_1$, switching the movable contact of the window-opening-direction relay 2D to the fixed contact connected to the power-supply terminal 12. In this state, in the window-opening-and-closing motor 1, the ground voltage is applied to one end, and the power supply voltage is applied to the other end. As a result, the window-opening-and-closing motor 1 rotates in the other direction, sliding the window in the opening direction.

When the window-opening-and-closing auto switch 7 is operated right after the operation to any of the direction of the driver-seat-window-opening-and-closing switch 6D, the window-opening-and-closing motor 1 rotates in either of the directions, sliding the window in the closing or opening direction for the same reason described above. At that time, however, the control unit 4 executes control to continue the sliding of the window in the closing or opening direction even if the operation of the driver-seat-window-opening-and-closing switch 6D and/or the operation of the window-opening-and-closing auto switch 7 are terminated. In addition, the sliding of the window in the closing or opening direction is continued until the window is completely closed or opened respectively.

When the front-passenger-seat-window-opening-and-closing switch 6A is operated to set the movable contact at a position to close the window on the front-passenger-seat-side, the control unit 4 detects the operation and outputs a signal to close the window to the front-passenger-seat-window-operating unit not shown in the figure. The signal to close the window is supplied to the external connection terminal 13 by way of the interface circuit 11. From the external connection terminal 13, the signal to close the window propagates to the front-passenger-seat-window-operating unit through the connection line, sliding the window in the closing direction. When the front-passenger-seat-window-opening-and-closing switch 6A is operated to set the movable contact at a position to open the window on the front-passenger-seat-side, on the other hand, the window is slid in the opening direction.

In exactly the same way, when the right-rear-seat-window-opening-and-closing switch 6R is operated to set the movable contact at a position to open or close the window on the right-rear-seat side, the control unit 4 generates a signal to open or close the window, sliding the window in the opening or closing direction respectively. Similarly, when the left-rear-seat-window-opening-and-closing switch 6L is operated to set the movable contact at a position to open or close the window on the left-rear-seat side, the control unit 4 generates a signal to open or close the window, sliding the window in the opening or closing direction respectively.

The next description explains the operation of the submergence-detecting power-window apparatus in an abnormal state of the car.

As a first abnormal condition, assume that a thing such as a finger is pinched while the window is being slid in the closing direction. In this case, the pinch-detecting circuit 10 detects the pinch by the window, outputting a pinch detection signal to the control unit 4. The control unit 4 immediately outputs a control signal for turning the second window-closing control transistor $3U_2$ off and, at the same time, outputs a control signal for turning the second window-opening control transistor $3D_2$ on. With the second window-closing control transistor $3U_2$ turned off, the first window-closing control transistor $3U_1$ is also turned off as well, halting the driving of the window-closing-direction relay 2U. With the second window-opening control transistor $3D_2$ turned on, on the other hand, the first window-opening control transistor $3D_1$ is also turned on as well, starting to drive the window-opening-direction relay 2D. As a result, the window-opening-and-closing motor 1 abruptly switches its rotation from the closing direction to the opening direction, sliding the window, which has been moving in the closing direction so far, to the opening direction. In addition, the control unit 4 can also be designed so that, when the control unit 4 receives a pinch detection signal from the pinch-detecting circuit 10, the control unit 4 immediately stops the rotation of the window-opening-and-closing motor 1 instead of switching the rotation of the window-opening-and-closing motor 1 from one direction to another as described above.

As a second abnormal condition, assume that the car submerges for some reasons, causing water to flow to the inside of the car. In this case, the submergence-detecting sensor $5_1$ employed in the submergence-detecting circuit 5 may become wet so that its impedance is reduced substantially. With the impedance reduced substantially, the switching transistor $5_2$ is turned on, lowering the collector voltage thereof from a level close to the power-supply voltage to the ground-voltage level. This ground voltage is outputted as the submergence detection signal. This submergence detection signal is supplied to the emitters of the first window-closing control transistor $3U_1$ and the first window-opening control transistor $3D_1$, the first window-closing control transistor $3U_1$ and the first window-opening control transistor $3D_1$ are turned off without regard to whether the first window-closing control transistor $3U_1$ and the first window-opening control transistor $3D_1$ are in an on or off state. At the same time, the submergence-time-window-opening-switch-driving circuit 9 as a submergence detection signal is supplied to the base of the switching transistor $9_1$. The submergence detection signal turns on the switching transistor $9_1$, which was in an off state so far. With the switching transistor $9_1$ turned on, the power-supply voltage is applied to the one of the fixed contacts of the submergence-time window-opening switch 8.

At that time, when the driver operates the submergence-time window-opening switch 8, the movable contact of the submergence-time window-opening switch 8 is switched from the other fixed contact connected to the ground to the fixed contact receiving the power-supply voltage. Thus, the power-supply voltage is supplied to the window-opening-direction relay 2D through the buffer diode $9_4$. The power-supply voltage energizes the window-opening-direction relay 2D. The contact of the window-opening-direction relay 2D is switched and the power-supply voltage is supplied to the other end of the motor 1. The window-opening-and-closing motor 1 is rotated in a direction to slide the window in the opening direction. In this way, the driver is capable of escaping from the car quickly.

Figure 2:
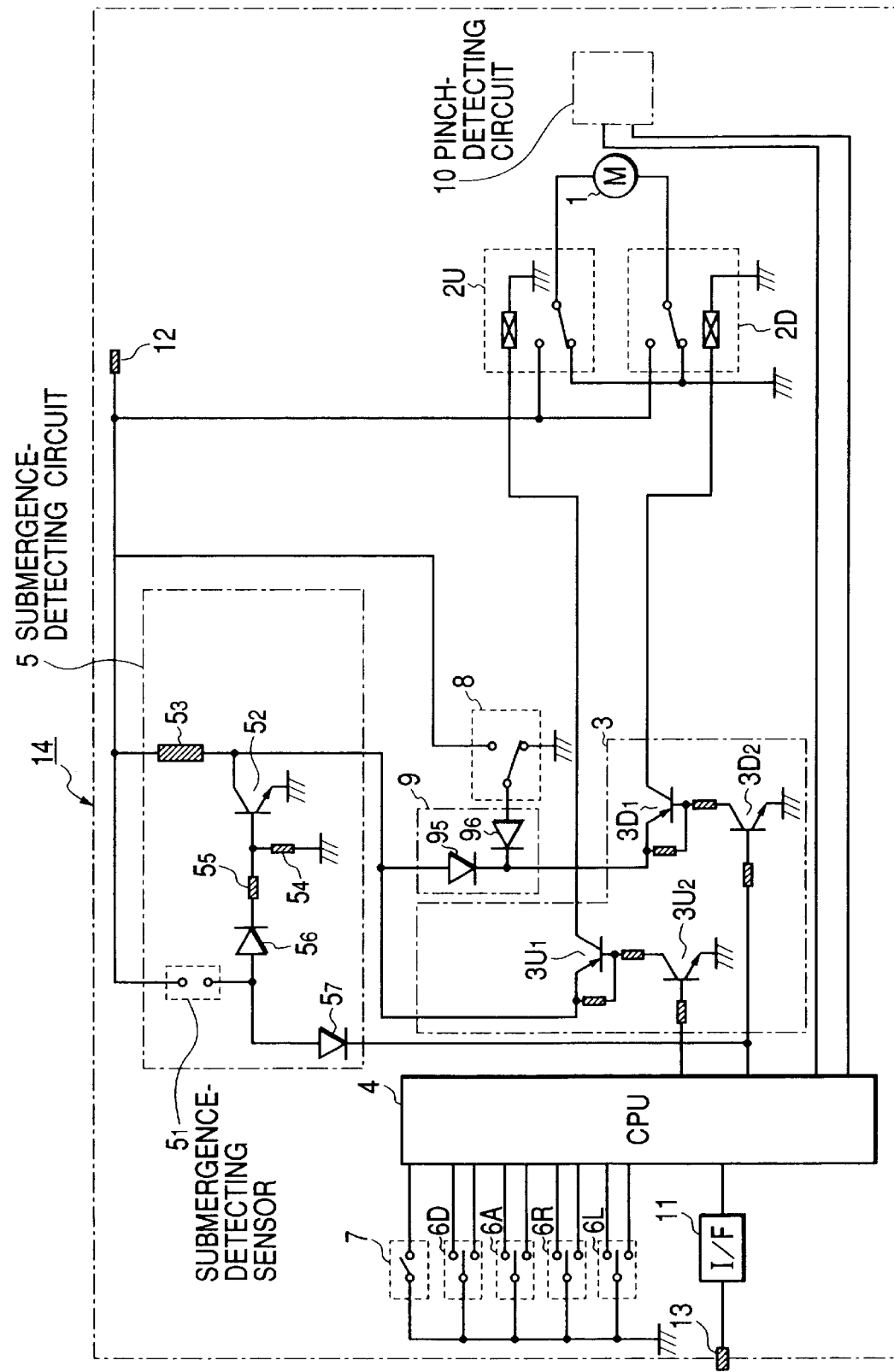
FIG. 2 is a circuit diagram showing the configuration of main components composing a submergence-detecting power-window apparatus implemented by a second embodiment of the present invention.
Figure 3:
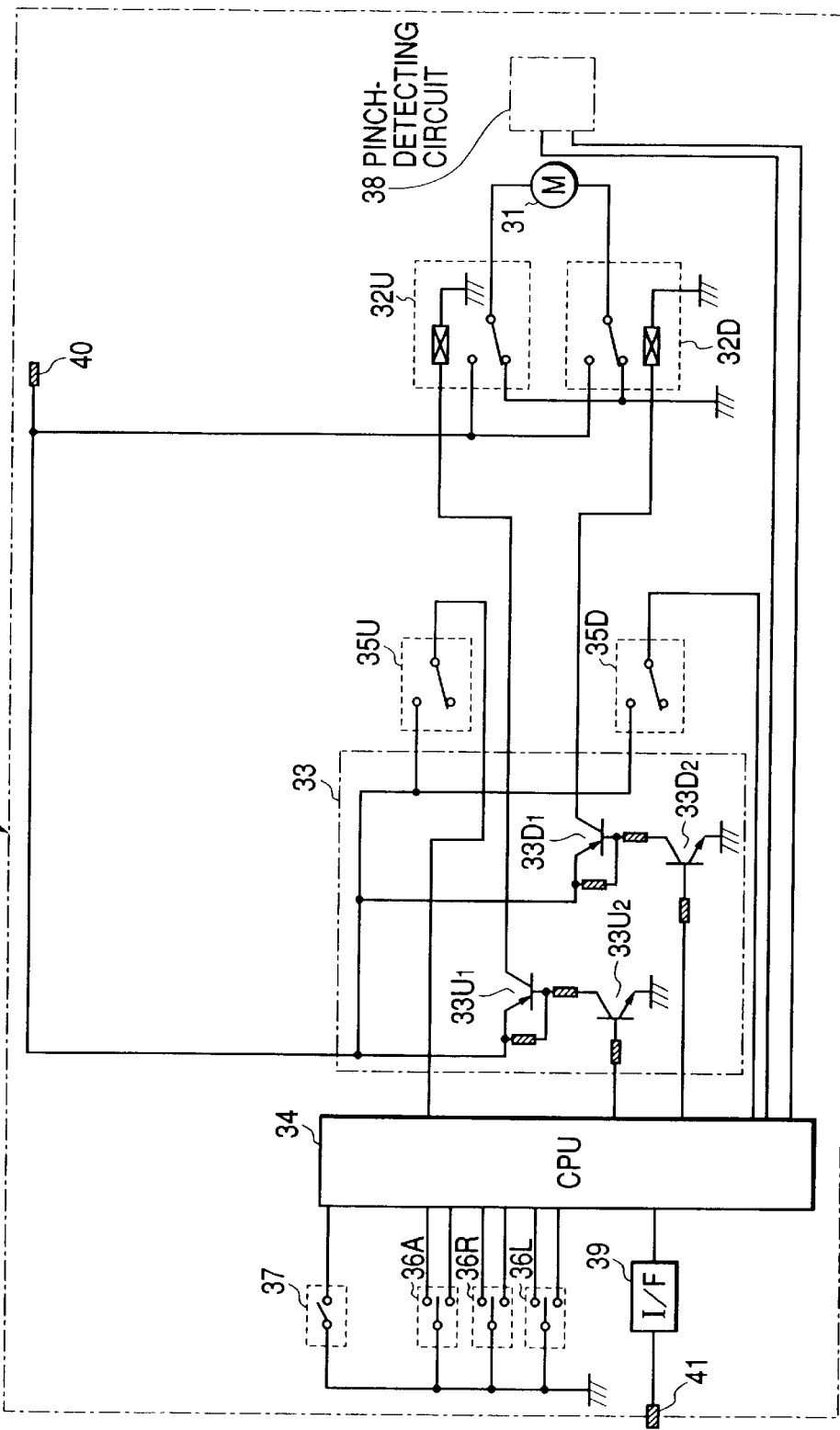
FIG. 3 is a circuit diagram showing a typical configuration of main components composing the conventional power-window apparatus.

FIG. 2 is a circuit diagram showing a configuration of main components composing a second embodiment implementing a submergence-detecting power-window apparatus provided by the present invention. To be more specific, the figure shows the configuration of a driver-seat-side-window-operating unit employed in the submergence-detecting power-window apparatus.

Configuration components of FIG. 2 identical with those shown in FIG. 1 are denoted by the same reference numerals as the latter.

As shown in FIG. 2, the driver-seat-side-window-operating unit 14 implemented by the second embodiment is identical with the driver-seat-side-window-operating unit 14 implemented by the first embodiment except for a difference in how the submergence-time window-opening switch 8 is connected to other components and minor differences in configurations of the submergence-detecting circuit 5 and the submergence-time-window-opening-switch-driving circuit 9.

To put it in detail, in the driver-seat-side-window-operating unit 14 implemented by the second embodiment, the submergence-detecting circuit 5 also includes two buffer diodes $5_6$ and $5_7$ in addition to the submergence-detecting sensor $5_1$, the switching transistor $5_2$, the collector resistor $5_3$, the base bias resistor $5_4$ and the base series resistor $5_5$. The submergence-time-window-opening-switch-driving circuit 9 comprises two buffer diodes $9_5$ and $9_6$.

In the submergence-detecting circuit 5, one of the terminals of the submergence-detecting sensor $5_1$ is connected to the power-supply terminal 12 and the other terminal is connected to the anodes of the buffer diodes $5_6$ and $5_7$. The base of the switching transistor $5_2$ is connected to the cathode of the buffer diode $5_6$ by the base-series resistor $5_5$ and connected to the ground by the base-bias resistor $5_4$. The collector of the switching transistor $5_2$ is connected to the power-supply terminal 12 by the collector resistor $5_3$ and connected to the emitter of the first window-closing control transistor $3U_1$. The emitter of the switching transistor $5_2$ is connected to the ground. The cathode of the buffer diode $5_7$ is connected to the base of the second window-opening control transistor $3D_2$. The movable contact of the submergence-time window-opening switch 8 is connected to the anode of the buffer diode $9_6$. One of the fixed contacts of the submergence-time window-opening switch 8 is connected to the power-supply terminal 12 whereas the other fixed contact of the submergence-time window-opening switch 8 is connected to the ground. In the submergencetime-window-opening-switch-driving circuit 9, the anode of the buffer diode $9_5$ is connected to the collector of the switching transistor $5_2$. The cathode of the buffer diode $9_5$ is connected to the cathode of the buffer diode $9_6$ and the emitter of the first window-opening control transistor $3D_1$.

The driver-seat-side-window-operating unit 14 implemented by the second embodiment with the configuration described above operates as follows.

Since the operation in the normal condition of the car is all but the same as the above described operation of the driver-seat-side-window-operating unit 14 implemented by the first embodiment, the operation of the driver-seat-side-window-operating unit 14 implemented by the second embodiment in the normal condition of the car is not explained.

A first operation in the abnormal condition of the car is an operation, which is carried out when a thing such as a finger is pinched while the window is being slid in the closing direction. This first operation is almost the same as the operation of the driver-seat-side-window-operating unit 14 implemented by first embodiment in the first abnormal condition described earlier. Thus, the first operation carried out by the driver-seat-side-window-operating unit 14 implemented by the second embodiment in the abnormal condition is not explained either.

A second operation in the abnormal condition of the car is an operation, which is carried out when the car submerges for some reasons, causing water to flow to the inside of the car. This second operation is different from the operation of the driver-seat-side-window-operating unit 14 implemented by first embodiment in the second abnormal condition described earlier. Thus, the second operation carried out by the driver-seat-side-window-operating unit 14 implemented by the second embodiment in the abnormal condition needs to be explained.

When water flows to the inside of the car, the submergence-detecting sensor $5_1$ employed in circuit 5 may become wet so that its impedance is reduced substantially. With the impedance reduced substantially, a bias is applied to the base of the switching transistor $5_2$ through the submergence-detecting sensor $5_1$, the buffer diode $5_6$ and the base-series resistor $5_5$, turning the switching transistor $5_2$ on. The switching transistor $5_2$ in the turned-on state lowers the collector voltage thereof from a level close to the power-supply voltage to the ground-voltage level, and the ground voltage is outputted as the submergence detection signal. The submergence detection signal is supplied to the emitter of the first window-closing control transistor $3U_1$ directly, and supplied to the emitter of the first window-opening control transistor $3D_1$ through the buffer diode $9_5$. The first window-closing control transistor $3U_1$ and the first window-opening control transistor $3D_1$ are turned off without regard to whether the first window-closing control transistor $3U_1$ and the first window-opening control transistor $3D_1$ are in an on or off state. At the same time, the power-supply voltage is applied to the base of the second window-opening control transistor $3D_2$ through the submergence-detecting sensor $5_1$ and the buffer diode $5_7$ to turn on the second window-opening control transistor $3D_2$.

When the driver operates the submergence-time window-opening switch 8 in this state, the movable contact of the submergence-time window-opening switch 8 is connected to the fixed contact, passing on the power-supply voltage to the emitter of the first window-opening control transistor $3D_1$ through the buffer diode $9_6$. Since the second window-opening control transistor $3D_2$ has already been turned on, the power-supply voltage also turns on the first window-opening control transistor $3D_1$. In this stage, the power-supply voltage is supplied to the window-opening-direction relay 2D by way of the submergence-time window-opening switch 8 and the first window-opening control transistor $3D_1$, driving the window-opening-direction relay 2D to switch the movable contact of the window-opening-direction relay 2D to the fixed contact. As a result, the power-supply voltage is applied to one end of the window-opening-and-closing motor 1 through the window-opening-direction relay 2D. The window-opening-and-closing motor 1 thereby rotates in a direction sliding the window in the opening direction. In this way, the driver is capable of escaping from the car quickly.

It should be noted that, while the first and second embodiments exemplify the driver-seat-side-window-operating unit 14 incorporating the pinch-detecting circuit 10, the pinch-detecting circuit 10 is not necessarily required in the power-window apparatus provided by the present invention. That is, the pinch-detecting circuit 10 can also be omitted.

The unit for operating the window on the driver-seat side is provided with a submergence-detecting circuit and a submergence-time window-opening switch in accordance with the present invention as described above. In such a unit for operating the window on the driver-seat side, the submergence-detecting circuit detects the submergence when the car submerges, outputting a submergence detection signal for immediately halting the operation to drive the window-opening-and-closing motor into a rotation and allowing the submergence-time window-opening switch to be operated to rotate the motor in a direction to open the window. Thus, the present invention demonstrates an effect that, by operating the submergence-time window-opening switch, the window can be surely opened even if portions of the unit for operating the window on the driver-seat side are affected by water flowing to the inside of the submerging car.

What is claimed is:

1. A submergence-detecting power-window apparatus comprising:

a window-opening-and-closing motor for opening or closing a window;

a motor-driving unit for selectively driving the window-opening-and-closing motor;

a switch control unit provided with control switches and used for supplying a control voltage to the motor-driving unit;

a window-opening-and-closing switch which is manually operated;

a control unit for turning on one of the control switches corresponding to an operation carried out on the window-opening-and-closing switch;

a submergence-detecting circuit including a submergence-detecting sensor; and a submergence-time window-opening switch which is effectively operated during the operation of the submergence-detecting circuit and which is manually operated, wherein:

when the manual operation is carried out on the window-opening-and-closing switch with the submergence-detecting circuit put in an inoperative state, the control unit turns on one of the control switches corresponding to the operation carried out on the window-opening-and-closing switch, the switch control unit applies the control voltage to the motor-driving unit through the turned-on control switch to drive the window-opening-and-closing motor in order to open or close the window; and with the submergence-detecting circuit put in an operative state by a submergence detected by the submergence-detecting sensor, the supply of the control voltage through any one of the control switches is disabled and a manual operation carried out on the submergence-time window-opening switch causes the control voltage to be supplied to the motor-driving unit through the submergence-time window-opening switch to drive the window-opening-and-closing motor in order to open the window.

2. A submergence-detecting power-window apparatus according to claim 1 wherein the submergence-time window-opening switch is directly connected to the motor-driving unit.

3. A submergence-detecting power-window apparatus according to claim 1, wherein the control switches are transistors.

4. A submergence-detecting power-window apparatus comprising:

a window-opening-and-closing motor for opening or closing a window;

a motor-driving unit for selectively driving the window-opening-and-closing motor;

a switch control unit provided with control switches and used for supplying a control voltage to the motor-driving unit;

a window-opening-and-closing switch which is manually operated;

a control unit for turning on one of the control switches corresponding to an operation carried out on the window-opening-and-closing switch;

a submergence-detecting circuit including a submergence-detecting sensor; and a submergence-time window-opening switch which is effectively operated during the operation of the submergence-detecting circuit and which is manually operated, wherein:

the submergence-time window-opening switch is connected to one of the control switches serving as a window-opening control switch; and when the manual operation is carried out on the window-opening-and-closing switch with the submergence-detecting circuit put in an inoperative state, the control unit turns on one of the control switches corresponding to the operation carried out on the window-opening-and-closing switch, and the switch control unit applies the control voltage to the motor-driving unit through the turned-on control switch to drive the window-opening-and-closing motor in order to open or close the window; and with the submergence-detecting circuit put in an operative state by a submergence detected by the submergence-detecting sensor, the supply of the control voltage through any one of the control switches is disabled and the window-opening control switch is turned on, and when the submergence-time window-opening switch is manually operated, the control voltage is supplied to the motor-driving unit by way of the submergence-time window-opening switch and the window-opening control switch, thereby driving the window-opening-and-closing motor to open the window.

5. A submergence-detecting power-window apparatus according to claim 4, wherein the window-opening control switch and the window-closing switch are transistors.

* * * * *